UNITED STATES PATENT OFFICE.

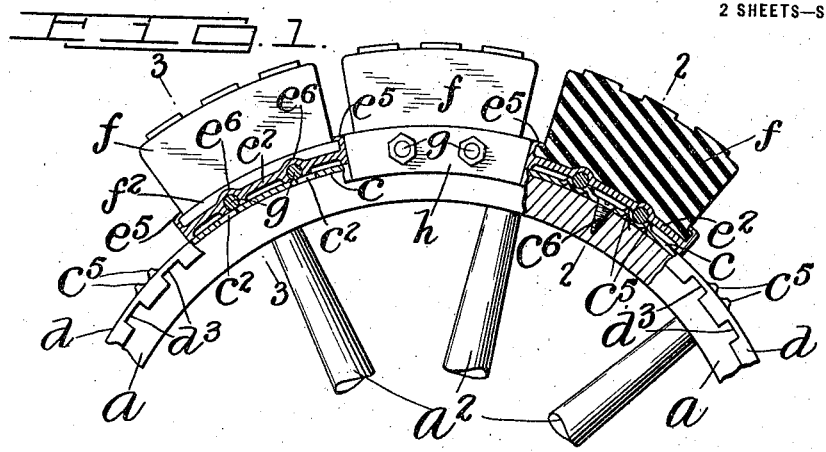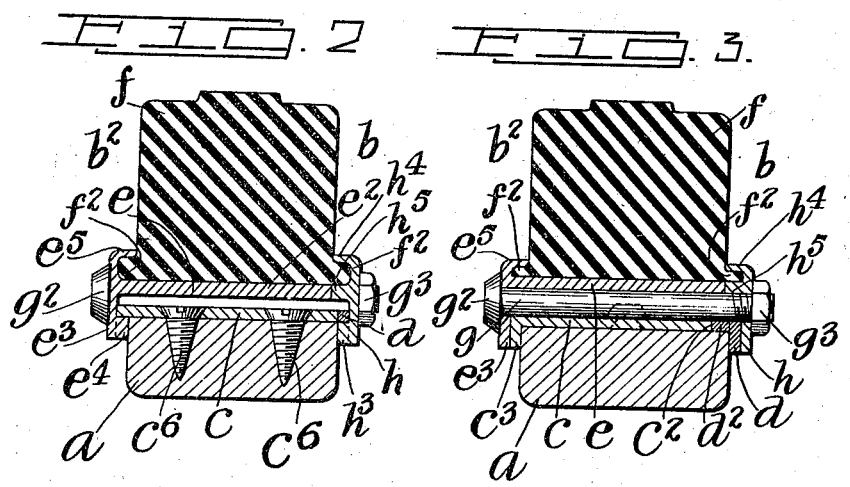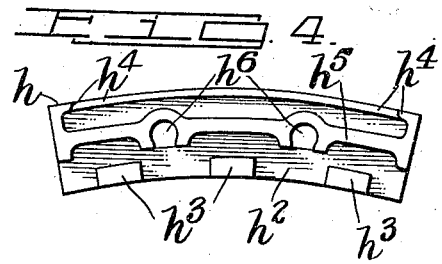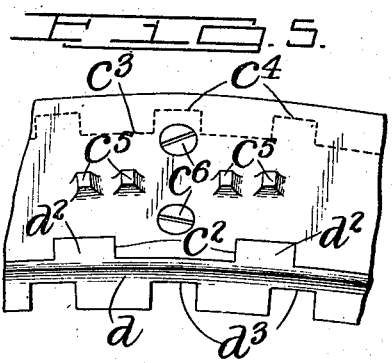

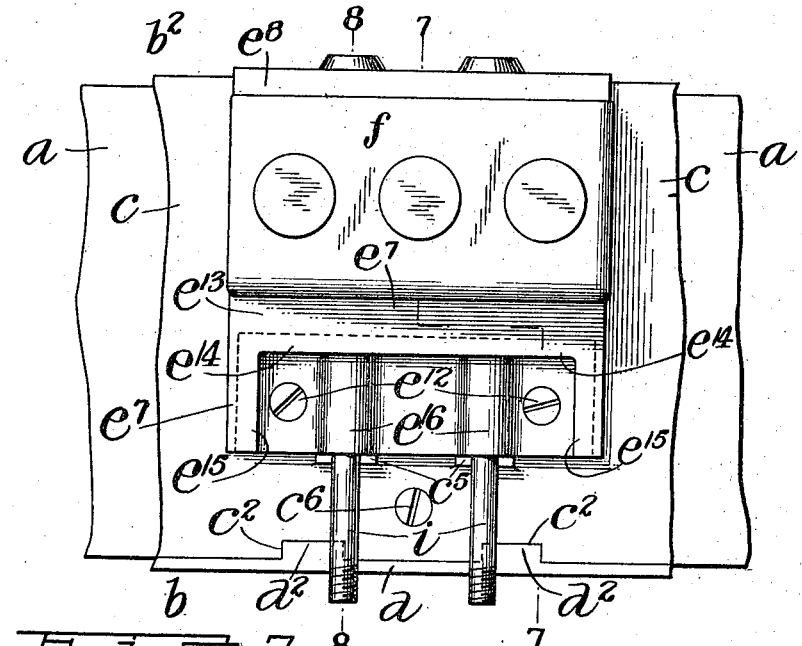
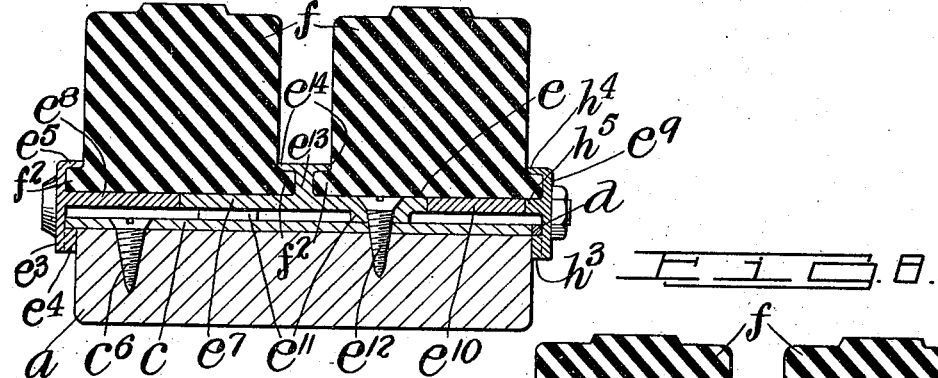
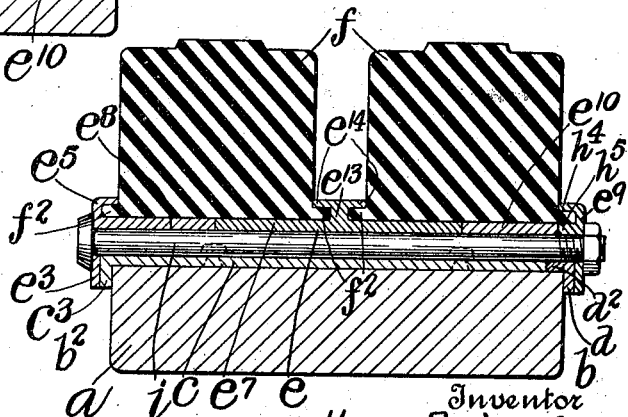

HARRY RAFLOVICH, OF NEW YORK, N. Y.

WHEEL-RIM AND TIRE CONSTRUCTION.

1,235,597.  Specification of Letters Patent.  Patented Aug. 7, 1917.

Application filed March 3, 1915. Serial No. 11,691.

*To all whom it may concern:*

Be it known that I, HARRY RAFLOVICH, a citizen of the United States, and residing at Bronx, New York, in the county of New York and State of New York, have invented certain new and useful Improvements in Wheel-Rim and Tire Constructions, of which the following is a specification, such as will enable those skilled in the art to which it appertains to make and use the same.

This invention relates to wheel rim and tire constructions, and especially to devices of this class in which a tire consists of separate elastic blocks and the means for and method of connecting said blocks with the rim, and the object of the invention is to provide a construction of the class specified which will be strong and durable and efficient in operation, and which may be quickly and easily repaired when necessary, and with this and other objects in view the invention consists in the construction, combination and arrangement of parts hereinafter described and claimed.

The invention is fully disclosed in the following specification, of which the accompanying drawings form a part, in which the separate parts of my improvement are designated by suitable reference characters in each of the views, and in which:—

Figure 1 is a side view of a part of a wheel provided with my improvement, and showing a single tire construction, part of the construction being in section and part broken away;

Fig. 2 a radial section on the line 2—2 of Fig. 1;

Fig. 3 a similar section on the line 3—3 of Fig. 1;

Fig. 4 an inside view of a part of an annular side plate which I employ on the outer side of the rim for securing the separate side blocks in position and which is made up of separate parts;

Fig. 5 an outside perspective view of a part of an annular rim plate which I employ and which extends entirely around the rim;

Fig. 6 a face view of a double tire construction which I employ and showing one of the tire blocks detached;

Fig. 7 a section on the line 7—7 of Fig. 6; and,

Fig. 8 a section on the line 8—8 of Fig. 6.

In the drawing forming part of this specification, I have shown at $a$ the felly of a wheel which may be of any preferred construction and composed of any suitable material, and said felly is provided with spokes $a^2$ which connect the same with the hub which is not shown.

For the purpose of this description the side $b$ will be called the outer side of the wheel and the side $b^2$ the inner side, and mounted on the felly $a$ is an annular rim plate $c$ which is wider than said felly and provided in its outer edge with spaced angular recesses $c^2$, and said plate is provided at its inner edge with an inwardly directed annular flange $c^3$, and the flange $c^3$ is provided with spaced angular recesses $c^4$, and said plate is provided centrally of its outer surface with projecting lugs $c^5$ which are arranged in pairs circumferentially thereof, and the plate $c$ is also secured to the felly $a$ by screws $c^6$, or in any other way. On the outer side of the felly is placed a detachable annular plate $d$ which corresponds with the flange $c^3$ and which is provided with inwardly directed angular tongues $d^2$ which fit in the recesses $c^2$ in the outer edge of the rim plate $c$, and the annular plate $d$ is also provided with spaced angular recesses $d^3$ which open inwardly and which correspond with the recesses $c^4$ in the flange $c^3$ at the inner edge of the rim plate $c$.

Inclosing the rim plate $c$ is a supplemental rim plate $e$ made up of separate block attaching parts $e^2$, and said separate parts $e^2$ are provided at their inner edges with inwardly directed flanges $e^3$ having inwardly directed lugs $e^4$ which fit in the recesses $c^4$ in the flange $c^3$ of the rim plate $c$, and said parts $e^2$ are also provided at their outer edges and at their ends with L-shaped flanges $e^5$ which hold the tire blocks $f$ in position, said tire blocks being provided with base flanges $f^2$ which are overlapped by the L-shaped flanges $e^5$. The separate parts $e^2$ of the supplemental rim plate $e$ are provided with spaced transverse thickened portions $e^6$ in which are formed transverse bores through which are passed bolts $g$.

Placed on the outer side of the rim is a supplemental side plate $h$ composed of separate parts $h^2$, an inside view of one of which is shown in Fig. 4, and the separate parts $h^2$ of the annular plate $h$ are provided in the inner side of their inner edges with angular lugs $h^3$ which fit in the angular recesses $d^3$ of the plate $d$ which is inclosed or covered by the plate $h$.

The separate parts $h^2$ of the plate $h$ are also provided at their ends and on the inner side of their outer edges with inwardly directed flanges or rims $h^4$ which are L-shaped in cross section, and which overlap the corresponding parts of the base flanges $f^2$ on the tire blocks $f$.

The parts $h^2$ of the plate $h$ are also provided centrally of their inner sides with longitudinal ribs $h^5$ in which are formed apertures $h^6$ which pass through said plates and through which the bolts $g$ pass, and said bolts serve to bind the parts $e^2$ of the plate $e$ and the plate $h$, together, and to secure said parts to the rim and to secure the tire blocks $f$ in position.

The tire blocks $f$ are made of rubber, rubber and canvas, or any suitable or similar material, and the foregoing completes the construction, or the description thereof, when a single tire or a single series of tire blocks are employed, but in the construction shown in Figs. 6 to 8 inclusive, I have shown my improvement as applied when two tire members or two series of tire blocks are employed, to form a double tire, and this construction is the same in all respects as that shown in Figs. 1 to 5 inclusive, except that two rows of the tire blocks are employed, and the outer supplemental rim plate $e$ is composed of a central member $e^7$, an inner member $e^8$, an outer member $e^9$ and an intermediate member $e^{10}$ placed between the outer member $e^9$ and the central member $e^7$.

The members $e^7$, $e^8$, $e^9$ and $e^{10}$ are made up of separate parts corresponding with the tire blocks $f$ the same as the parts $e^2$ and $h^2$ in the construction shown in Figs. 1 to 5.

With this construction the inner member $e^8$ corresponds in all respects with the part $e^2$ in Figs. 1 to 5 inclusive, with the exception that its transverse width is less, and the outer member $e^9$ is exactly the same as the outer plate $h$ in Figs. 1 to 5, and the intermediate member $e^{10}$ simply serves as a spacer between the parts $e^7$ and $e^8$.

The central member $e^7$, or the separate parts thereof, are provided on their underside with studs $e^{11}$ and screws $e^{12}$ are passed inwardly through said members and through said lugs in order to secure the central member, or the parts thereof, to the rim $a$, and said central member, or the parts thereof, are also provided with T-shaped circumferential locking ribs $e^{13}$, the side flanges $e^{14}$ of which overlap the base flanges $f^2$ at the inner side of the tire blocks $f$, and the members $e^7$ are also provided at their ends with inwardly directed flanges $e^{15}$ which overlap the base flanges of the blocks $f$ at the ends thereof.

The parts $e^7$, $e^8$, $e^9$ and $e^{10}$ are also provided with raised transverse rib members $e^{16}$ through which are passed bolts $i$ similar to the bolts $g$ and intended to bind the parts $e^7$, $e^8$, $e^9$ and $e^{10}$ together and to lock the same to the rim plate $c$ and to secure the tire blocks $f$ in position.

The rim plate $c$ is employed in this construction the same as in that shown in Figs. 1 to 5, and the details of the construction of said rim plate and of the part $e^9$ which corresponds with the part $h$ in Figs. 1 to 5 are the same, in construction and operation, as in Figs. 1 to 5, and the outer edge portion of the part $e^8$ is the same in all respects, as the parts $e^3$, $e^4$ and $e^5$ in Figs. 1 to 5 inclusive.

With the construction shown in Figs. 1 to 5, the separate tire blocks may be taken off and replaced whenever desired by simply detaching the outer plate members $h$, and with the construction shown in Figs. 6 to 8 inclusive, the outer tire blocks $f$ may be taken off and replaced in the same manner by detaching the outer plate member $e^9$, and the inner tire blocks $f$ may be taken off and replaced by detaching the inner plate member $e^8$.

It will also be seen that in the construction shown in Figs. 1 to 5 inclusive, the supplemental outer side plate $h$ forms a part of the supplemental rim member $e$ and the parts of the plate $h$ correspond with the parts of the supplemental rim member $e$, while the plate $d$ forms a part of rim plate $c$; and in the construction shown in Figs. 6 to 8 inclusive, the outer side rim plate $e^9$ forms a part of the supplemental rim member $e$ which is made up of three annular members, all of which are divided into transverse parts which correspond with the tire blocks $f$ as is also the plate $e^9$, and in this form of construction the rim plate $c$ and the plate $d$ are the same as in Figs. 1 to 5 inclusive.

While I have shown and described the form or forms of construction which I prefer, my invention is not limited to the details of said form or forms, as herein shown and described, and changes therein and modifications thereof may be made, within the scope of the claims, without departing from the spirit of my invention or sacrificing its advantages.

Having fully described my invention, what I claim as new and desire to secure by Letters Patent, is:—

1. The combination with a wheel felly of a rim mounted thereon and provided at its opposite sides with locking flanges which overlap said felly, a supplemental rim mounted on said rim and comprising a plurality of sections having means engaging said locking flanges each of said sections being composed of separate parts provided with transversely and circumferentially extending locking flanges, a tire block mounted in each of said sections and having base flanges engaged by said section locking flanges for securing said blocks in the sections, and means for locking the separate parts of the sections together and for securing the sections to the rim and felly.

2. The combination with a wheel felly, of a rim mounted thereon and provided at its opposite sides with notched flanges which overlap said felly, a supplemental rim mounted on said rim and consisting of a plurality of sections composed of a plurality of separate parts having lugs which engage the notches of the rim flanges, the separate parts of each of said sections having transversely and circumferentially extending locking flanges, a tire block mounted in each of said sections and having base flanges engaged by said locking flanges for securing said blocks in the sections, and means for locking the separate parts of each section together and for securing the sections to the rim, each section being secured to the rim independent of adjacent sections.

3. The combination with a wheel felly, of a rim mounted thereon and provided at its opposite sides with notched flanges which overlap said felly and provided on its periphery with a series of spaced lugs, a supplemental rim mounted on said rim and consisting of a plurality of sections having means engaging the notches of the rim flanges, each of said sections being divided longitudinally to form two separate parts having transversely and circumferentially extending locking flanges, a tire block mounted in each of said sections and having base flanges engaged by the flanges of the separate parts for securing the blocks in the sections, and means engaging the rim lugs for securing the units of each section together and for securing the sections to the rim.

4. The combination with a wheel felly, of a rim mounted thereon and provided at its opposite sides with notched flanges which overlap said felly, and provided on its periphery with a series of spaced lugs, a supplemental rim mounted on said rim and consisting of a plurality of sections having means engaging the notches of the rim flanges, each of said sections being divided longitudinally to form two separate parts having transversely and circumferentially extending locking flanges, a tire block mounted in each of said sections and having base flanges engaged by the flanges of the separate parts for securing the blocks in the sections, a transversely extending web provided on each of said separate parts having bolt bosses open on their under sides, and bolts passing through said bosses and engaging said rim lugs for securing the separate parts of each section together and for securing the sections to the rim.

In testimony that I claim the foregoing as my invention I have signed my name in presence of the subscribing witnesses this 1st day of March, 1915.

HARRY RAFLOVICH.

Witnesses:
C. MULREANY,
H. E. THOMPSON.

Copies of this patent may be obtained for five cents each, by addressing the "Commissioner of Patents, Washington, D. C."